United States Patent
Betz et al.

(10) Patent No.: US 9,475,454 B2
(45) Date of Patent: Oct. 25, 2016

(54) BELT TENSIONER FOR A SAFETY BELT SYSTEM

(71) Applicant: TRW Automotive GmbH, Alfdorf (DE)

(72) Inventors: Hans-Peter Betz, Bobingen (DE); Dominik Seitzer, Schwaebisch Gmuend (DE); Karl Ruediger, Weilheim (DE)

(73) Assignee: TRW Automotive GmbH (DE)

( * ) Notice: Subject to any disclaimer, the term of this patent is extended or adjusted under 35 U.S.C. 154(b) by 138 days.

(21) Appl. No.: 14/352,064

(22) PCT Filed: Oct. 22, 2012

(86) PCT No.: PCT/EP2012/004412
§ 371 (c)(1),
(2) Date: Apr. 16, 2014

(87) PCT Pub. No.: WO2013/060437
PCT Pub. Date: May 2, 2013

(65) Prior Publication Data
US 2015/0291125 A1    Oct. 15, 2015

(30) Foreign Application Priority Data
Oct. 27, 2011  (DE) .......................... 10 2011 117 052

(51) Int. Cl.
*B60R 22/34*   (2006.01)
*B60R 22/195*  (2006.01)
*B60R 22/46*   (2006.01)

(52) U.S. Cl.
CPC ....... *B60R 22/3408* (2013.01); *B60R 22/1952* (2013.01); *B60R 22/1954* (2013.01); *B60R 22/46* (2013.01); *B60R 22/4619* (2013.01); *B60R 22/4628* (2013.01); *B60R 2022/3427* (2013.01); *B60R 2022/4642* (2013.01); *B60R 2022/4647* (2013.01)

(58) Field of Classification Search
CPC .......................... B60R 22/34; B60R 22/3408
USPC ............................................. 242/376
See application file for complete search history.

(56) References Cited

U.S. PATENT DOCUMENTS

| | | | |
|---|---|---|---|
| 4,119,281 A | 10/1978 | Paitula et al. | |
| 4,623,104 A * | 11/1986 | Mori | B60R 22/34 242/376 |
| 4,967,976 A * | 11/1990 | Kawai | B60R 22/34 242/376 |
| 5,452,863 A * | 9/1995 | Hardy, Sr. | B60R 22/34 242/376 |
| 6,336,606 B1 * | 1/2002 | Smithson | B60R 22/34 242/376 |
| 6,405,962 B1 * | 6/2002 | Hirase | B60R 22/3413 242/379.1 |
| 2003/0010858 A1 | 1/2003 | Wier | |

FOREIGN PATENT DOCUMENTS

| | | |
|---|---|---|
| DE | 2704084 | 11/1977 |
| DE | 19901143 | 5/2000 |

(Continued)

*Primary Examiner* — Sang Kim
(74) *Attorney, Agent, or Firm* — Tarolli, Sundheim, Covell & Tummino LLP (57) ABSTRACT

The invention relates to a belt tensioner (10) for a seat belt system comprising a belt shaft housing (18), a belt shaft (12) pivoted about an axis (A) in the belt shaft housing (18) as well as a belt shaft inserting element (20) at which one end (14) of the webbing (16) is fixed, wherein the belt shaft (12) includes a recess (22) for receiving the belt shaft inserting element (20) and wherein the belt shaft inserting element (20) is adapted to be introduced substantially radially into the recess (22).

11 Claims, 8 Drawing Sheets

(56) References Cited

FOREIGN PATENT DOCUMENTS

| | | |
|---|---|---|
| DE | 20315633 | 3/2004 |
| DE | 10313551 | 9/2004 |
| EP | 1270346 | 1/2003 |
| EP | 1526047 | 4/2005 |
| WO | 99/19176 | 4/1999 |

* cited by examiner

BELT TENSIONER FOR A SAFETY BELT SYSTEM

RELATED APPLICATIONS

This application corresponds to PCT/EP2012/004412, filed Oct. 22, 2012, which claims the benefit of German Application No. 10 2011 117 052.2, filed Oct. 27, 2011, the subject matter, of which are incorporated herein by reference in their entirety.

BACKGROUND OF THE INVENTION

The invention relates to a belt tensioner for seat belt systems in vehicles, especially an end fitting tensioner.

Belt tensioners for seat belt systems are generally known already from automotive engineering. In so-called end fitting tensioners in the case of activation of the belt tensioner the actually fixed end of a webbing usually connected to the seat frame or the vehicle body is tightened in order to provide for tensioning of the entire webbing. In the state of the art both linearly operating as well as rotatory end fitting tensioners are described. In the rotatory end fitting tensioners the webbing end is connected to a belt shaft which is driven upon activation of the belt tensioner so as to wind webbing onto the belt shaft.

For the assembly of the seat belt system, especially in respect of end fitting tensioners increasingly a process is desired in which the webbing end is secured to the belt tensioner only after the belt tensioner has been mounted on the vehicle body or on the seat frame.

In order to permit said subsequent securing of the webbing, DE 103 13 551 B3 suggests a seat belt retractor in which a hollow belt shaft pivoted in the belt shaft housing includes an end-side aperture and an axially aligned belt shaft slit. Moreover, in a housing leg of the belt shaft housing a feed-through slit is further provided so that the end of the webbing formed as end loop can be introduced into the hollow belt shaft together with a belt pin inserted in the end loop in the axial direction and can be fixed there.

Such subsequent arrangement of the webbing at the belt shaft requires considerable space in the axial direction, however, which is not always provided in the area of an already mounted end fitting tensioner. Consequently, in narrow space conditions the suggested securing of the webbing end to the belt shaft is not possible or only possible with great mounting efforts.

SUMMARY OF THE INVENTION

It is the object of the invention to provide a belt tensioner in which the end of a webbing can be subsequently secured to a belt shaft of the rotatory belt tensioner with little mounting effort.

This object is achieved according to the invention by a belt tensioner for a seat belt system comprising a belt shaft housing, a belt shaft pivoted about an axis in the belt shaft housing as well as a belt shaft inserting element to which one end of the webbing is fastened, wherein the belt shaft includes a recess for receiving the belt shaft inserting element and wherein the belt shaft inserting element can be introduced substantially radially into the recess. Hence in this case no axial mounting space is required to fasten the webbing end to the belt shaft. The radial mounting space required instead is present anyway, on the other hand, as in the completely assembled state of the seat belt system the webbing extends radially away from the belt shaft across exactly said space used for webbing fastening.

In an embodiment of the belt tensioner the belt shaft includes a fork bearing for fixing the belt shaft inserting element in a rotationally fixed manner, the belt shaft inserting element being adapted to be introduced substantially radially into the fork bearing. Said fork bearing permits a rotationally fixed connection between the belt shaft inserting element and the belt shaft at low costs. For this purpose, the belt shaft inserting element is configured as a thick plate or rod of substantially rectangular or trapezoid cross-section and is received in the fork bearing in an accurately fitting manner.

Preferably, opposed axial ends of the belt shaft inserting element extend axially beyond the webbing, the axial ends being configured as bearing portions for bearing the belt shaft inserting element in the belt shaft. Thus it is ensured in a simple manner that the bearing portions of the belt shaft inserting element do not obstruct winding of webbing during the tensioning operation.

Furthermore, the belt shaft inserting element can be symmetric, especially a symmetric steel plate. Said symmetry facilitates subsequent securing of the webbing to the belt shaft and prevents faulty mounting.

In the belt tensioner according to the invention the end of the webbing is preferably stitched to form a loop, the loop enclosing at least part of the belt shaft inserting element. The design of a loop constitutes a simple, inexpensive and reliable option of securing a webbing end.

In another embodiment of the belt tensioner, at its axial ends the belt shaft includes shaft butts connected by a belt shaft land. In this way, in the area of the belt shaft land the belt shaft inserting element including the webbing secured thereto can be easily accommodated, while the shaft butts permit simple support of the belt shaft rotatable about an axis in the belt shaft housing.

In this embodiment of the belt tensioner preferably in at least one shaft butt a fork bearing for the belt shaft inserting element is formed. For example, the fork bearing is a radial bearing slit in the shaft butt in which a bearing portion of the belt shaft inserting element positively engages so as to connect the belt shaft inserting element to the belt shaft in a rotationally fixed manner.

Preferably the belt shaft and, especially preferred, also the belt shaft housing have a symmetric design. Analogously to the symmetric design of the belt shaft inserting element, this symmetry, too, contributes to a reduction of faulty mounting and thus to simpler assembly. Moreover, due to the symmetric individual components both a belt tensioner for the driver side and (mirror-inverted) a belt tensioner for the passenger side of a vehicle can be assembled with identical component parts. Thus the variety of component parts and the related storage costs are reduced and the assembly of the seat belt system is further facilitated.

In another embodiment of the belt tensioner the belt shaft housing is U-shaped in an axial section and includes a housing land as well as two opposite housing legs, each housing leg having a housing aperture through which the belt shaft extends. Such belt shaft housing can be manufactured as bent stamped part of sheet metal, especially sheet steel, at low costs.

In this embodiment, preferably a distance between the housing legs is larger in the area of the housing land than in the area of the free leg ends. Sort of an "omega" shape of the belt shaft housing is resulting, whereby the belt forces occurring can be easily absorbed. Moreover, an advantageous bearing for the belt shaft is provided so that the belt shaft can be a cast part, especially made of zinc die cast.

Preferably in this embodiment of the belt tensioner the distance between the housing legs varies in the area of the housing apertures, in an especially preferred manner exclusively in the area of the housing apertures.

BRIEF DESCRIPTION OF THE DRAWINGS

Further features and advantages are evident from the following description of preferred embodiments with reference to the drawings, in which.

DESCRIPTION OF EMBODIMENTS

FIGS. 1 to 4 show a belt tensioner 10 for a seat belt system in a vehicle, concretely speaking a so called end fitting tensioner, comprising a belt shaft 12 at which one end 14 of a webbing 16 is fixed and a belt shaft housing 18 adapted to be fixedly mounted on the body in which the belt shaft 12 is supported, wherein the belt shaft 12 can be rotated relative to the belt shaft housing 18 after activation of the belt tensioner 10 so as to wind up webbing 16.

In the shown embodiment, the end 14 of the webbing 16 is stitched to form a loop enclosing a belt shaft inserting element 20, wherein the belt shaft inserting element 20 is received in a recess 22 of the belt shaft 12 and is supported relative to the belt shaft 12 in a rotationally fixed manner.

Figure 2:
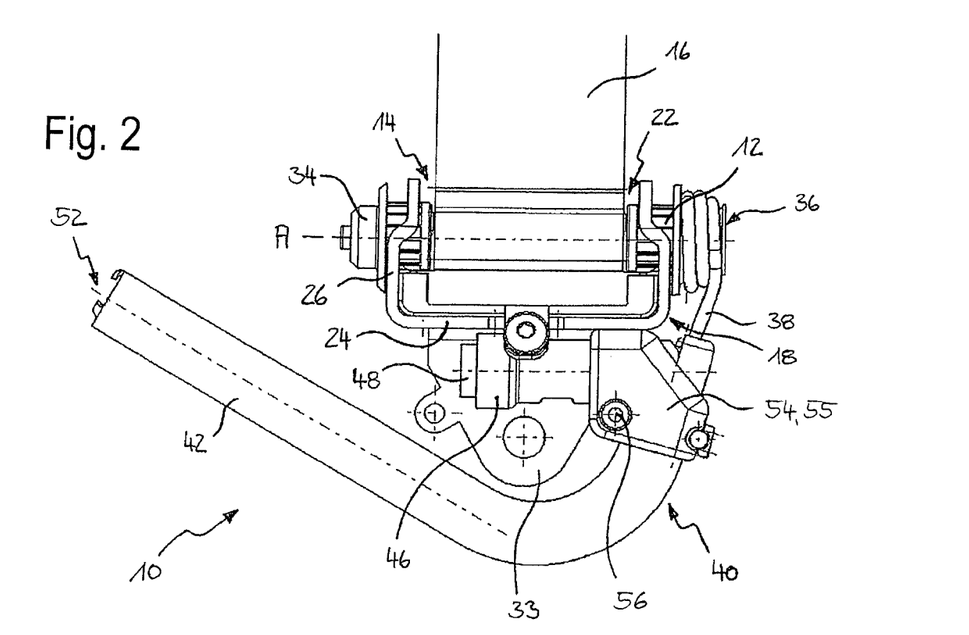
FIG. 2 is a top view of the belt tensioner according to FIG. 1.
Figure 3:
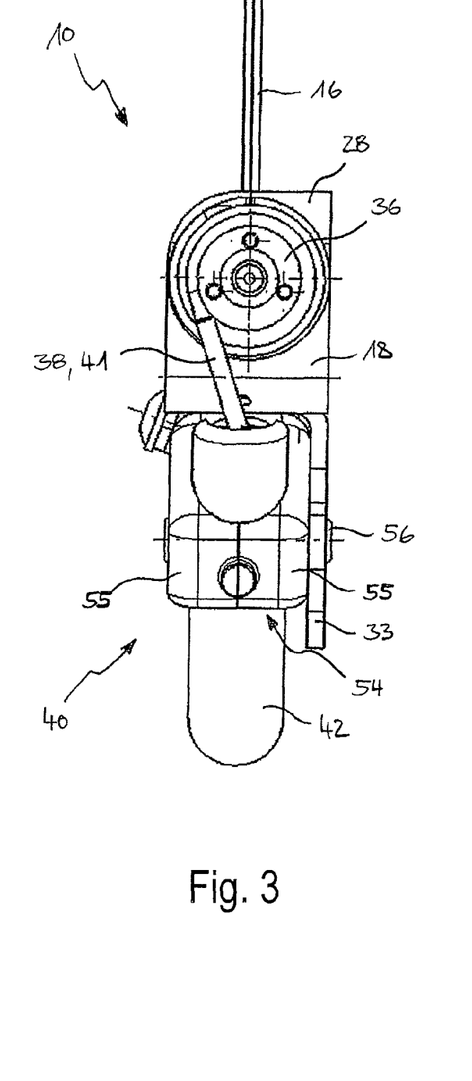
FIG. 3 is a side view of the belt tensioner according to FIG. 1.
Figure 4:
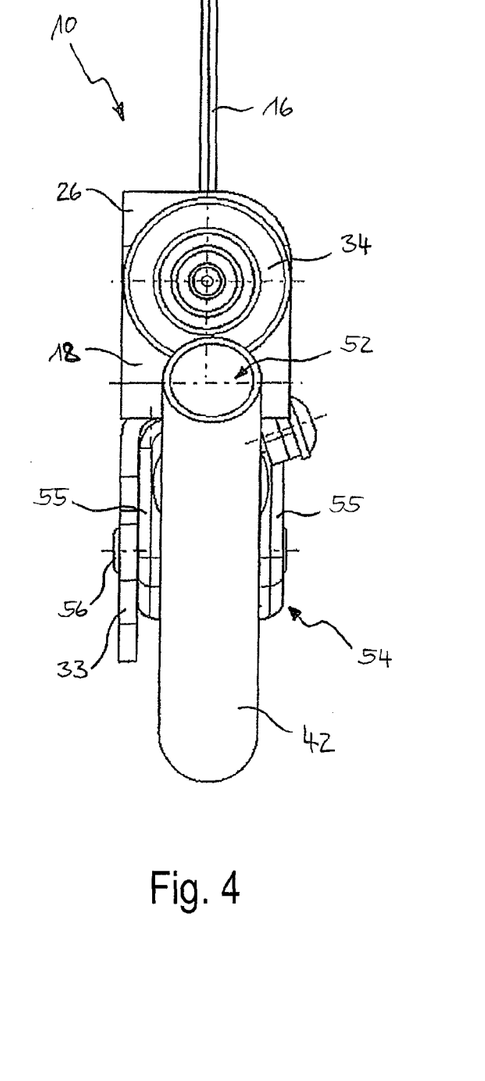
FIG. 4 is another side view of the belt tensioner according to FIG. 1.

According to FIG. 2, the belt shaft housing 18 of the belt tensioner 10 is U-shaped and comprises a housing land 24 as well as two opposite housing legs 26, 28, each housing leg 26, 28 having a housing aperture 30, 32 through which the belt shaft 12 extends. Furthermore, a securing strap 33 bent from the housing land 24 is provided through which the belt shaft housing 18 can be tightly connected, especially screwed, to a vehicle seat or a vehicle body.

Figure 1:
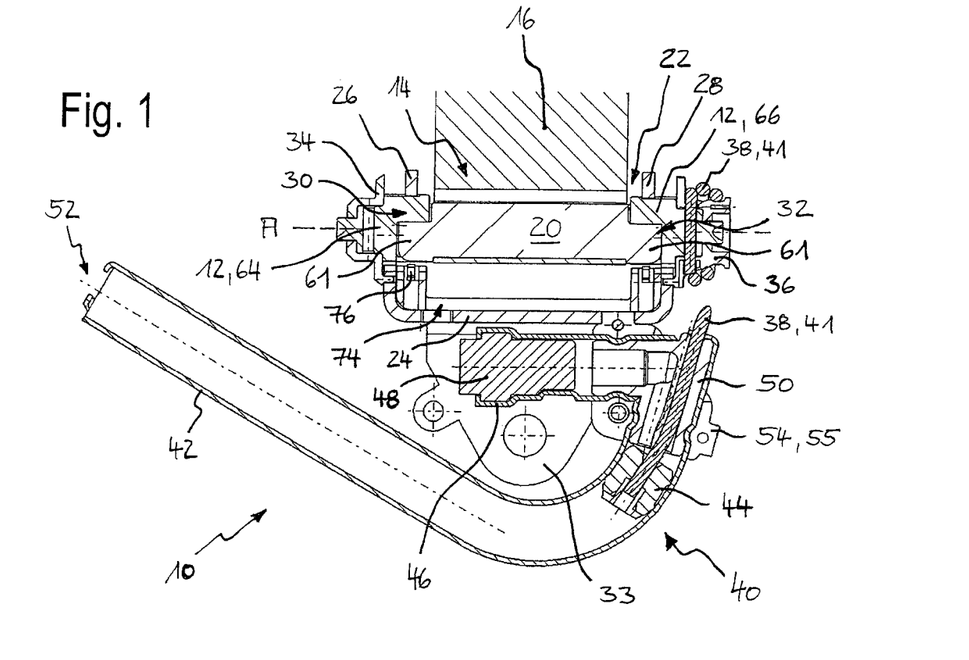
FIG. 1 shows an axial longitudinal section across a belt tensioner according to the invention.

The belt shaft 12 is pivoted about an axis A in the belt shaft housing 18. At the axial ends of the belt shaft 12 an end cover 34 and, resp., a rope reel 36 are disposed, the end cover 34 and the rope reel 36 being tightly connected to, especially pressed with the belt shaft 12 and preventing axial movement of the belt shaft 12 relative to the belt shaft housing 18 or minimizing the same to little axial play.

In order to be able to tighten the webbing 16 upon activation of the belt tensioner 10 a force transmission element 38 is provided for coupling the belt shaft 12 to a tensioner drive 40. In the illustrated embodiment, the force transmission element 38 is a pull rope 41 being partly wound onto the rope reel 36 and fastened by one rope end to the rope reel 36.

The tensioner drive 40 of the belt tensioner 10 comprises a tensioner tube 42 for receiving and guiding a pressurizing element 44 as well as a separate generator housing 46 for receiving a gas generator 48. The generator housing 46 is a tube length in the shown embodiment so that both the tensioner tube 42 and the generator housing 46 are made of a metal tube, especially a steel tube. Moreover a coupling element 50 is provided for tightly connecting the generator housing 46 to the tensioner tube 42 (cf. FIG. 1).

According to FIG. 1, the pressurizing element 44 is a piston which is substantially sealed in the bent tensioner tube 42 and is accommodated to be movable along a tubular axis. The pull rope 41 fixed by one rope end to the rope reel 36 extends from the rope reel 36 into the tensioner tube 42 and is fastened there to the piston by an opposite rope end. Upon activation of the gas generator 48, gas pressure is applied to the piston and the piston moves in the direction of a free tube end 62 of the tensioner tube 42. While the belt shaft 12 rotates, pull rope 41 is unwound from the rope reel 36 and at the same time webbing 16 is wound onto the belt shaft 12 so that belt tensioning takes place.

In order to reinforce the connection between the tensioner tube 42 and the generator housing 46 and to provide a simple connection between the tensioner drive 40 and the belt shaft housing 18 a stabilizing unit 54 is further provided. Said stabilizing unit 54 in the present case includes two stabilizing elements 55, especially made of zinc die cast, and a fastener 56 configured e.g. as tubular rivet (cf. FIGS. 3 and 4).

Figure 23:
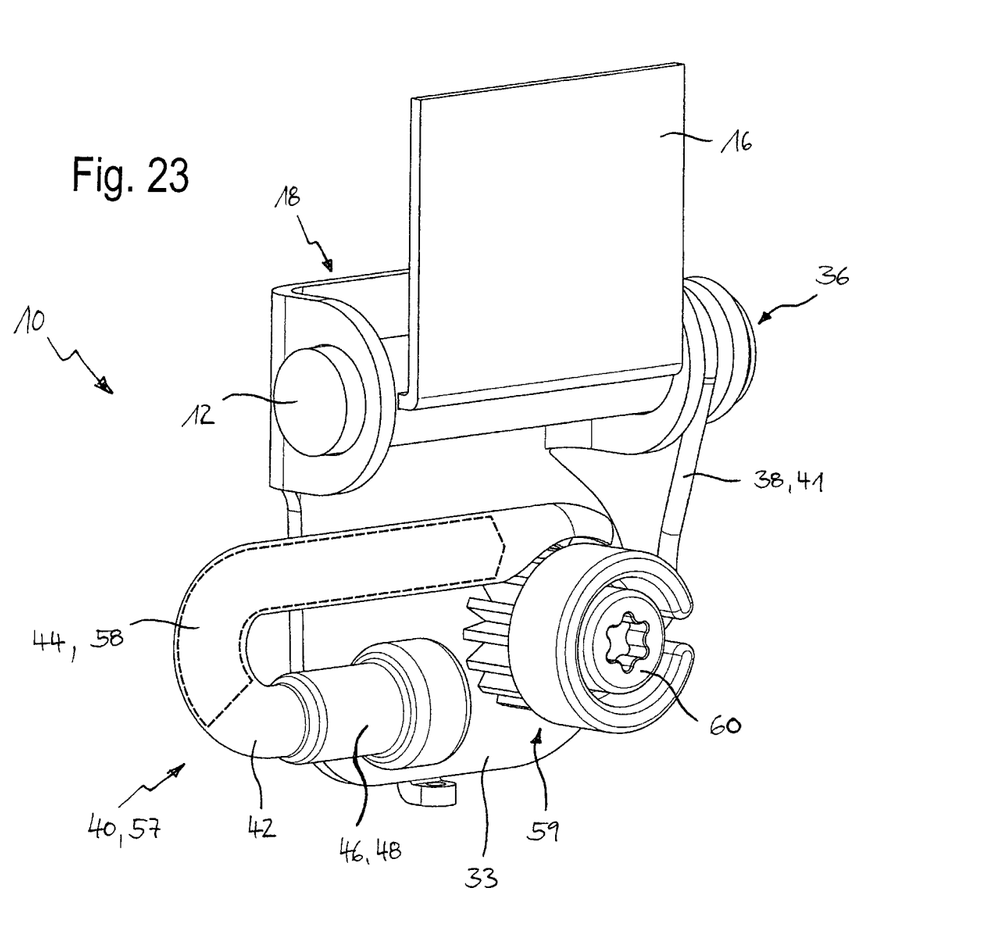
FIG. 23 shows a schematic perspective view of a belt tensioner according to the invention comprising an alternative tensioner drive.

As a matter of course, the belt tensioner 10 according to FIGS. 1 to 4 can also be driven by a hydraulic motor or can be equipped with a different alternative tensioner drive 40, especially a so called "power snake" drive. By way of example, in FIG. 23 a combined drive 57 including a "power snake" 58 as pressurizing element 44 and a pull rope 41 is shown. The power snake 58 is a flexible, elastically and/or plastically deformable plastic member which is accommodated to be largely sealed and guided to be longitudinally movable in the tensioner tube 42. Upon activation of the belt tensioner 10, gas pressure is applied to the power snake 58 which is displaced toward the free tube end 52, wherein the power snake 58 is deformed by a drive pinion 59 so that it engages in the drive pinion 59 and drives the same in the tensioning direction. Accordingly, the pull rope 41 is wound onto a rope drum 60 of the drive pinion 59, on the one hand, and is unwound from the rope reel 36 of the belt tensioner, on the other hand, while the belt shaft 12 rotates so that belt tensioning takes place.

In the shown embodiments, the belt tensioner 10 has a particularly advantageous design which shall be illustrated hereinafter in detail by way of FIGS. 5 to 15.

Figure 5:
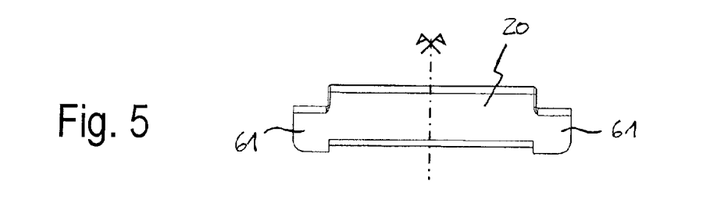
FIG. 5 is a top view of a belt shaft inserting element for the belt tensioner according to FIGS. 1 to 4.

FIG. 5 shows the belt shaft inserting element 20 which in this case is exemplified as a cut and possibly formed metal plate. For the rest, the belt shaft inserting element 20 is symmetric, especially a symmetric steel plate.

Figure 6:
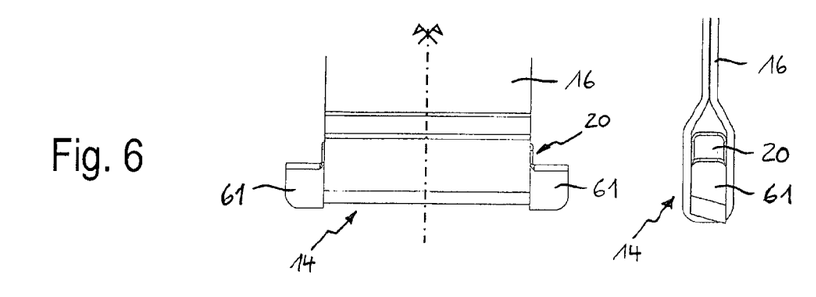
FIG. 6 is a top view and a side view of the belt shaft inserting element fastened to a webbing according to FIG. 5.

According to FIG. 6, the end 14 of the webbing 16 is stitched to form a loop, the loop enclosing the belt shaft inserting element 20. Thus the end 14 of the webbing 16 is reliably fastened on the belt shaft inserting element 20.

Opposite axial ends of the belt shaft inserting element 20 extend axially beyond the webbing 16, the axial ends being in the form of bearing portions 61 for bearing the belt shaft inserting element 20 in the belt shaft 12.

Figure 7:
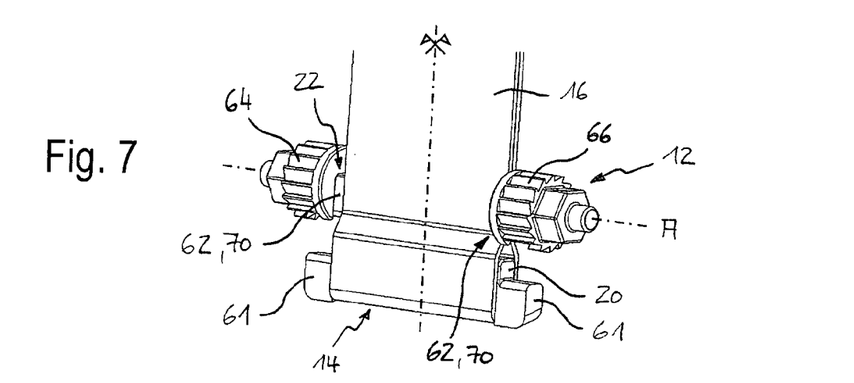
FIG. 7, shows a perspective view of the belt shaft inserting element fastened to the webbing according to FIG. 6 prior to mounting on the belt shaft.

FIG. 7 illustrates a perspective view of the belt shaft 12 comprising the recess 22 for receiving the belt shaft inserting element 20, the belt shaft inserting element 20 being adapted to be introduced into the recess 22 substantially radially relative to the axis A.

In the present embodiment the belt shaft 12 includes a fork bearing 62 for rotationally fixed fixation of the belt shaft inserting element 20, wherein the belt shaft inserting element 20 can be introduced substantially radially into the fork bearing 62.

Figure 8:
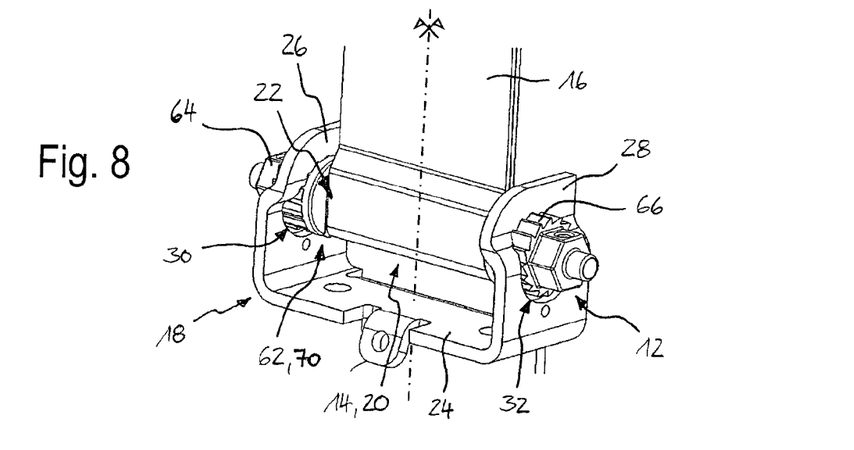
FIG. 8 shows a perspective view of the belt shaft supported in a belt shaft housing with mounted webbing.
Figure 9:
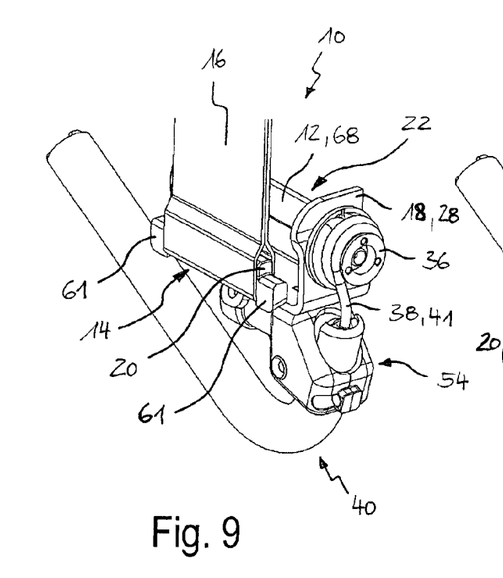
FIG. 9 shows a perspective view of the belt tensioner according to FIGS. 1 to 4 prior to mounting the belt shaft inserting element.

At its axial ends the belt shaft 12 includes shaft butts 64, 66 connected by a belt shaft land 68 (cf. FIG. 9). Due to this design, in the area of the belt shaft land 68 the recess 22 for receiving the belt shaft inserting element 20 is easily formed and in the area of the shaft butts 64, 66 a bearing of the belt shaft 12 in the belt shaft housing 18 rotatable about the axis A is formed (FIG. 8).

From FIG. 7 in combination with FIG. 1 it is further evident that in each of the two shaft butts 64, 66 a fork bearing 62 for the belt shaft inserting element 20 is formed. Said fork bearings 62 in the present case are radial bearing slits 70 in which the bearing portions 61 of the belt shaft inserting element 20 engage in an accurately fitting and positive manner so that in the mounted final state according to FIG. 8 the belt shaft inserting element 20 is connected to the belt shaft 12 in a rotationally fixed manner.

FIGS. 9 to 12 illustrate the process of subsequent mounting of the webbing 16 on the belt tensioner 10 which was fixedly installed at a seat frame or a body of a vehicle already before.

Figure 10:
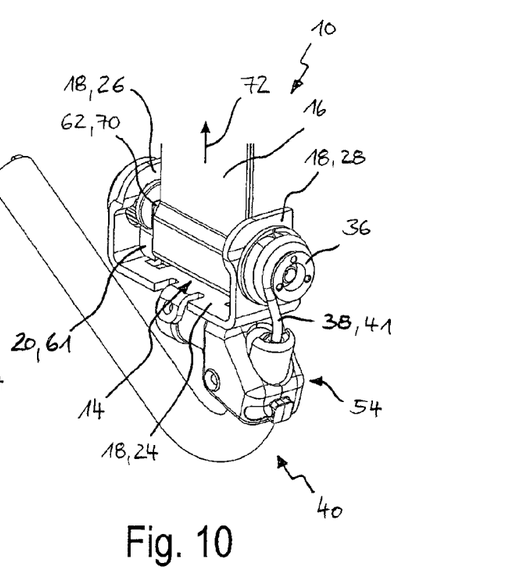
FIG. 10 shows a perspective view of the belt tensioner according to FIGS. 1 to 4 during mounting the belt shaft inserting element.

According to FIG. 9, the belt shaft inserting element 20 with webbing 16 fastened thereto is supplied to the already installed part of the belt tensioner 10, until the bearing portions 61 of the belt shaft inserting element 20 are provided radially outside the fork bearings 62 formed in the belt shaft 12 (cf. FIG. 10).

As indicated in FIG. 10 by an arrow 72, the belt shaft inserting element 20 subsequently can be introduced into the recess 22 and the fork bearings 62 by a radial movement relative to the belt shaft 12 so that the belt shaft inserting element 20 is connected to the belt shaft 12 in a rotationally fixed manner (cf. FIG. 11).

Figure 11:
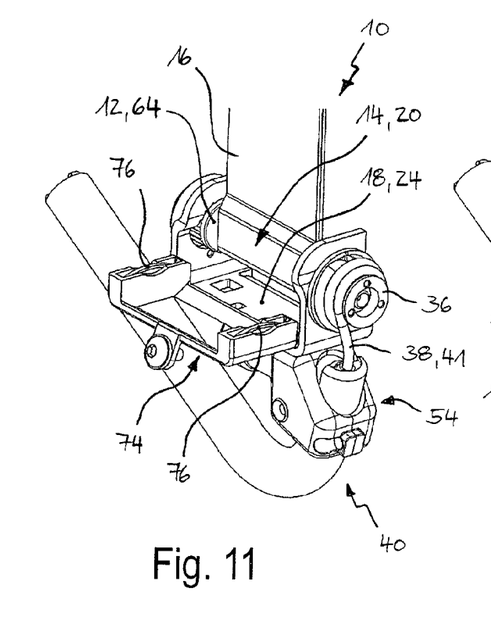
FIG. 11 shows a perspective view of the belt tensioner according to FIGS. 1 to 4 after mounting the belt shaft inserting element and prior to mounting a belt shaft securing unit.
Figure 12:
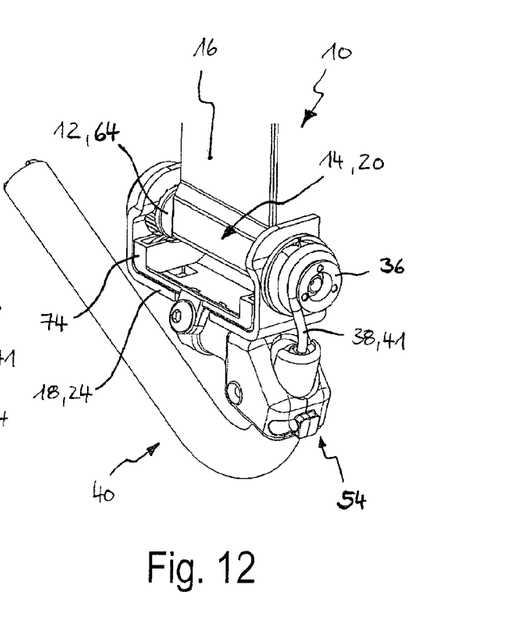
FIG. 12 shows a perspective view of the belt tensioner according to FIGS. 1 to 4 in the completely mounted state.

In order to prevent the belt shaft inserting element 20 and the webbing 16 fastened thereto from inadvertently detaching from the belt shaft 12, according to FIG. 11 a belt shaft securing unit 74 is inserted between the belt shaft 12 and the housing land 24 of the belt shaft housing 18 and is fixed at the belt shaft housing 18 (FIG. 12). Said belt shaft securing unit 74 is designed such that it can be inserted only when the belt shaft inserting element 20 is correctly mounted on the belt shaft 12 so that faulty mounting of the belt shaft inserting element 20 on the belt shaft 12 is excluded.

Moreover, the belt shaft securing unit 74 includes spring elements 76 which in the completely mounted state of the belt tensioner 10 according to FIG. 12 drive the belt shaft 12 into its locked position.

Figure 13:
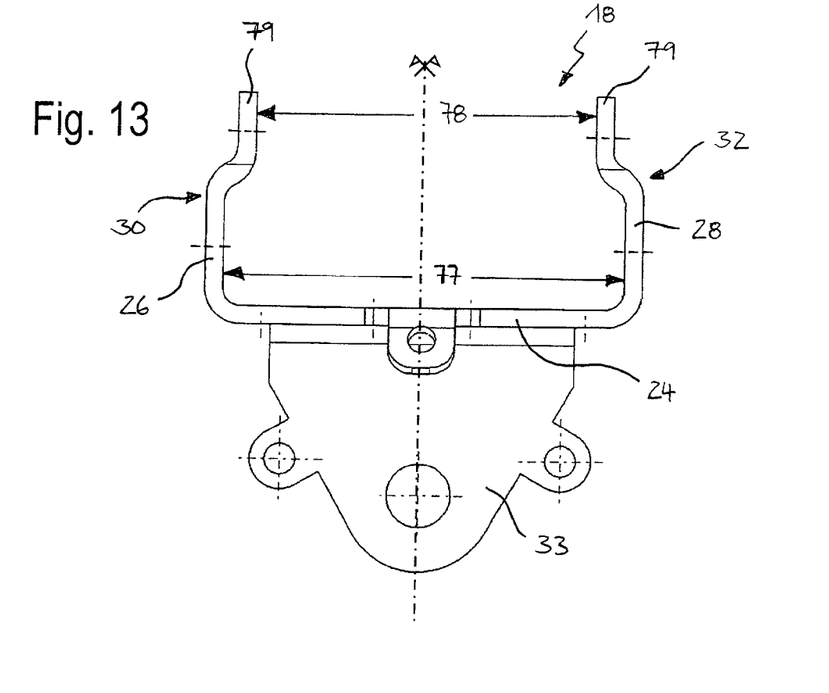
FIG. 13 is a detailed view of a belt shaft housing for the belt tensioner according to FIGS. 1 to 4.
Figure 14:
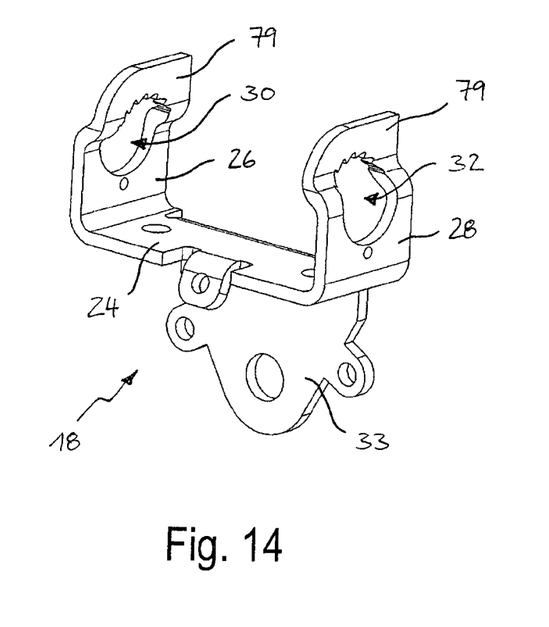
FIG. 14 is a perspective view of the belt shaft housing according to FIG. 13.
Figure 15:
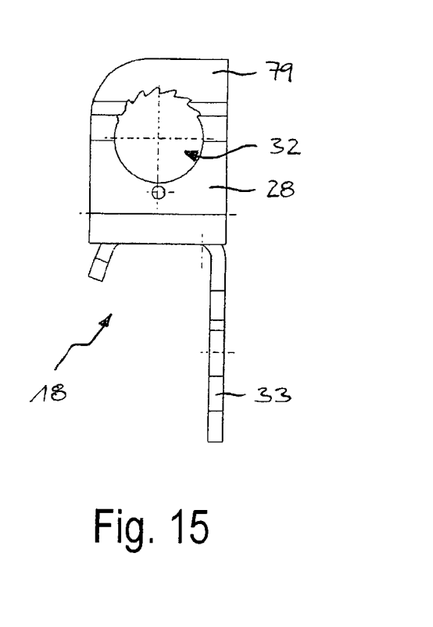
FIG. 15 is a side view of the belt shaft housing according to FIG. 13.

FIGS. 13 to 15 show different detailed views of the belt shaft housing 18. Therefrom it is visible that the belt shaft housing 18 is U-shaped in axial section and includes the housing land 24 as well as two opposed housing legs 26, 28, wherein each housing leg 26, 28 has a housing aperture 30, 32 through which the belt shaft 12 can extend (cf. FIGS. 1 and 2).

A distance 77 between the housing legs 26, 28 in the area of the housing land 24 is larger than a distance 78 in the area of the free leg ends 79 so that the housing shape in this axial section reminds of the Greek capital letter "omega".

The distance between the housing legs 26, 28 according to FIGS. 13 and 14 varies exclusively in the area of the housing apertures 30, 32.

This housing shape contributes to an especially advantageous force flow inside the belt tensioner 10, as it is possible due to this housing shape to hook the belt shaft inserting element 20 stitched into the webbing 16 in the belt shaft 12 for introducing load and to dimension the same so that the breaking load is introduced into the belt shaft housing 18 via the belt shaft inserting element 20. Thus it is possible to manufacture the belt shaft 12 as cast part, especially made of zinc die cast.

Figure 16:
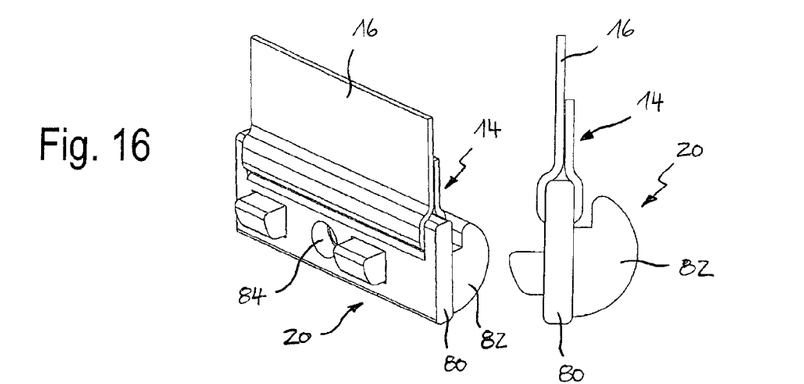
FIG. 16 shows the belt shaft inserting element for the belt tensioner according to the invention in accordance with an alternative embodiment.

FIG. 16 shows the belt shaft inserting element 20 with webbing 16 fastened thereto according to an alternative embodiment. The belt shaft inserting element 20 is formed in two parts in this case comprising a base 80 on which the end 14 of the webbing 16 is fastened as well a winding form 82 connected to the base 80 in a rotationally fixed manner. The winding form 82 serves for providing a more symmetric, ideally circular core for winding the webbing 16.

The base 80 and the winding form 82 possibly can be screwed to each other, which is indicated by a threaded bore 84 in FIG. 16. In this case it is imaginable to screw also the belt shaft 12, concretely speaking the belt shaft land 68 of the belt shaft 12, to the belt shaft inserting element 20, concretely speaking to the base 80 and the winding form 82. Via such screw connection, possibly with torque interrogation, likewise a correct mounting of the belt shaft inserting element 20 on the belt shaft 12 can be ensured so that regarding this function the belt shaft securing unit 74 can be dispensed with.

Figure 17:
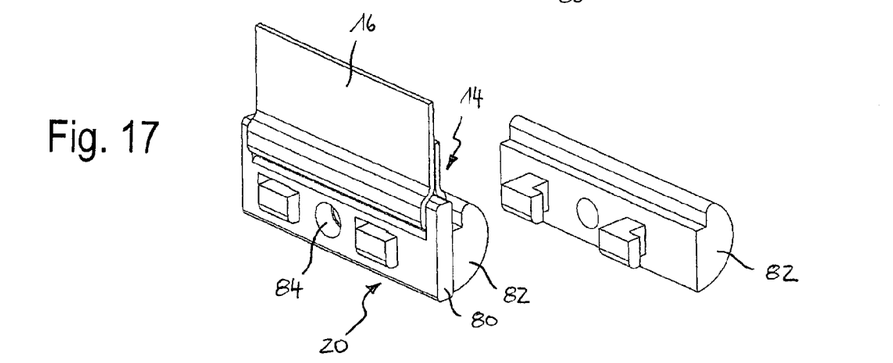
FIG. 17 shows the belt shaft inserting element for the belt tensioner according to the invention in accordance with another alternative embodiment.

FIG. 17 shows another alternative embodiment of a two-part belt shaft inserting element 20 which differs from the embodiment according to FIG. 16 merely by the connection between the base 80 and the winding form 82.

Figure 18:
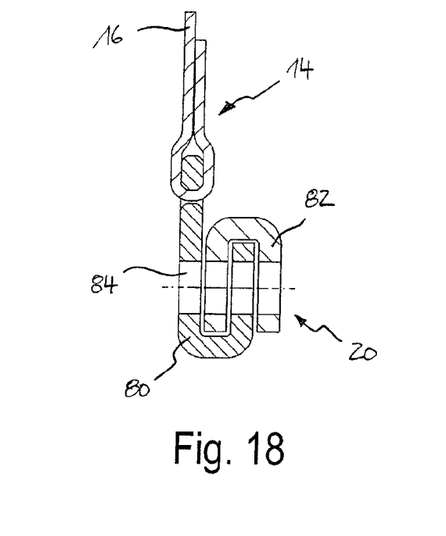
FIG. 18 shows a section across the belt shaft inserting element for the belt tensioner of the invention in accordance with another alternative embodiment.
Figure 19:
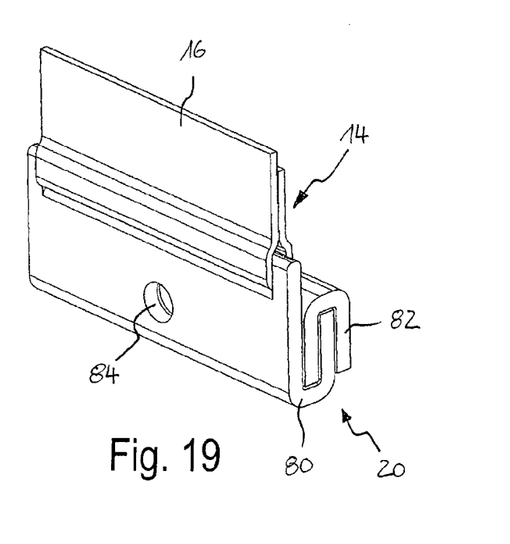
FIG. 19 shows a perspective view of the belt shaft inserting element according to FIG. 18.

FIGS. 18 and 19 show a further alternative embodiment of a two-part belt shaft inserting element 20 which, compared to the two previous embodiments, merely differs by the shaping of the base 80 and the winding form 82 again.

It is the objective of these belt shaft inserting elements 20 composed of several parts to provide, together with the belt shaft land 68 of the belt shaft 12 (cf. FIG. 9), a core which is possibly symmetric, ideally circular relative to the axis A for winding up the webbing 16.

Figure 20:
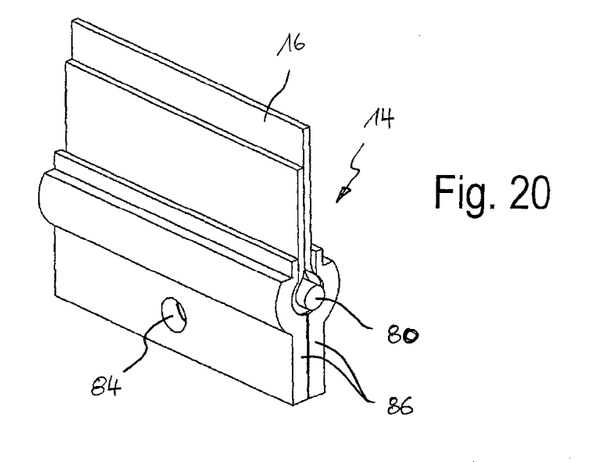
FIG. 20 shows the belt shaft inserting element for the belt tensioner of the invention in accordance with another alternative embodiment during assembly.
Figures 21, 22:
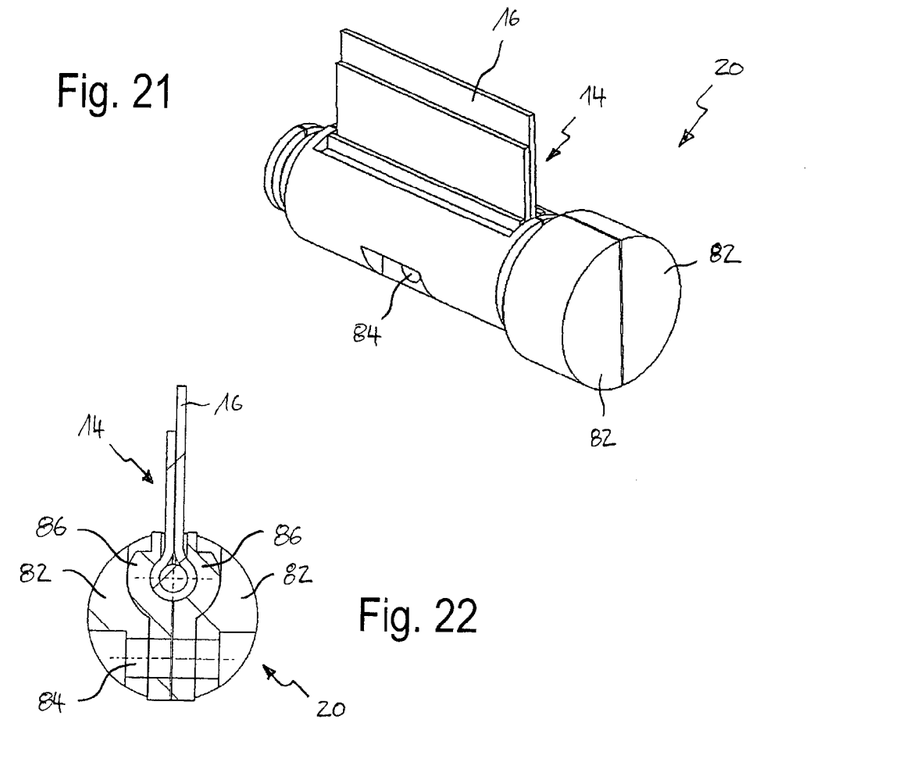
FIG. 21 shows the belt shaft inserting element according to FIG. 20 after being assembled.
FIG. 22 shows the belt shaft inserting element according to FIG. 21 in section.

FIGS. 18 to 20 illustrate another alternative embodiment of a belt shaft inserting element 20 composed of several parts which is already very close to an ideal circular core for winding up the webbing 16.

The base 80 of the belt shaft inserting element 20 according to FIG. 18 in the form of an inserting pin is first inserted into the loop formed at the end 14 of the webbing 16 and is radially fixed by two intermediate elements 86. After that, the two-part winding form 82 is arranged and the multi-part belt shaft inserting element 20 is fixed by a screw screwed into the threaded bores 84.

The invention claimed is:

1. A belt tensioner for a seat belt system, comprising:
a belt shaft housing (18),
a belt shaft (12) pivoted about an axis (A) in the belt shaft housing (18), wherein an axis of the belt shaft moves into two different positions within the bet shaft housing, and
a belt shaft inserting element (20) on which one end (14) of a webbing (16) is fastened, the belt shaft inserting element connecting the webbing to the belt shaft,
wherein the belt shaft (12) includes a recess (22) for receiving the belt shaft inserting element (20) and
wherein the belt shaft inserting element (20) can be introduced substantially radially into the recess (22), and
wherein that opposite axial ends of the belt shaft inserting element (20) extend axially beyond the webbing (16), wherein the axial ends are configured as bearing portions (61) for bearing the belt shaft inserting element (20) in the belt shaft (12).

2. The belt tensioner according to claim 1, wherein the belt shaft (12) includes a fork bearing (62) for fixing the belt shaft inserting element (20) for rotation with the belt shaft (12), the belt shaft inserting element (20) being adapted to be introduced substantially radially into the fork bearing (62).

3. The belt tensioner according to claim 1, wherein the belt shaft inserting element (20) is symmetric.

4. The belt tensioner according to claim 1, wherein the end (14) of the webbing (16) is stitched to form a loop, the loop enclosing at least part of the belt shaft inserting element (20).

5. The belt tensioner according to claim 1, wherein axial ends of the belt shaft (12) include shaft butts (64, 66) connected by a belt shaft land (68).

6. The belt tensioner according to claim 5, wherein in at least one shaft butt (64, 66) a fork bearing (62) for the belt shaft inserting element (20) is formed.

7. The belt tensioner according to claim 1, wherein the belt shaft (12) has a symmetric design.

8. The belt tensioner according to claim 1, wherein the belt shaft housing (18) has a symmetric design.

9. The belt tensioner according to claim 8, wherein a distance between the housing legs (26, 28) is larger in the area of the housing land (24) than in the area of the free leg ends (79).

10. The belt tensioner according to claim 8, wherein the distance between the housing legs (26, 28) varies in the area of the housing apertures (30, 32).

11. The belt tensioner according to claim 1, wherein in axial section the belt shaft housing (18) is substantially U-shaped and includes a housing land (24) as well as two opposite housing legs (26, 28), each housing leg (26, 28) having a housing aperture (30, 32) through which the belt shaft (12) extends.

* * * * *

UNITED STATES PATENT AND TRADEMARK OFFICE
CERTIFICATE OF CORRECTION

PATENT NO.         : 9,475,454 B2
APPLICATION NO.    : 14/352064
DATED              : October 25, 2016
INVENTOR(S)        : Hans-Peter Betz et al.

It is certified that error appears in the above-identified patent and that said Letters Patent is hereby corrected as shown below:

In the Specification

Column 7, Line 33 reads "the bet shaft" should read --the belt shaft--

Signed and Sealed this
Twenty-fourth Day of January, 2017

Michelle K. Lee
*Director of the United States Patent and Trademark Office*